United States Patent Office 2,762,789
Patented Sept. 11, 1956

2,762,789
POLYESTERS

James Wotherspoon Fisher, Spondon, near Derby, and James Lincoln, London, England, assignors to Celanese Corporation of America, a corporation of Delaware No Drawing. Application April 9, 1952,
Serial No. 281,474

Claims priority, application Great Britain April 28, 1947

13 Claims. (Cl. 260—75)

This invention relates to improved linear polyesters and to processes for their production, and is a continuation in part of our application S. No. 19,885 filed 8th April 1948, now abandoned.

Generally linear polyesters are produced by condensation of reagents containing two and only two reactive groups, the reactive groups forming ester linkages which join the original molecules together to form the polymer chain. Thus, for example, a linear polyester may be produced by condensing a glycol with a dicarboxylic acid, the carboxylic groups reacting with the hydroxy groups to form the ester linkages. With the ordinary aliphatic glycols and dicarboxylic acids, it is virtually impossible to produce a polyester of relatively high melting point, say a melting point above about 180 or 200° C. In most cases the melting points of the polymers produced are in the range of 80–150° C., which is much too low for many purposes and particularly for most applications of films and filaments.

We have now found that in the production of polyesters from dihydroxy compounds and dicarboxylic acids, much improved results as regards melting point may be obtained by condensing an aromatic dicarboxylic acid or an ester-forming derivative thereof with a glycol, or an ester-forming derivative thereof, in which each hydroxyl group is linked through a hetero atom to certain positions in an aromatic nucleus. The hetero atom may, for example, be —O—, —S—, —SO₂— and —NR—. We may use glycols containing a single benzene nucleus linked in the para position to each hydroxyl group through a hetero atom. These compounds have the formula

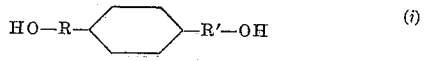

where R and R' are linkages including a hetero atom. Particularly important, however, are glycols containing two benzene nuclei linked to each other directly or through other atoms or groups, e. g. —(CH₂)ₙ—, —CO—, —O—, —S—, —SO₂— and —NR—, and linked in the 4.4′ positions to the hydroxyl groups through hetero atoms. These glycols have the formula

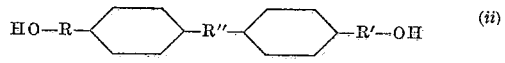

where R and R' are linkages each including a hetero atom and R″ is a direct link or one or more carbon atoms and/or hetero atoms. Compounds of Formula II are for the purpose of this specification termed compounds of the diphenyl series whether R″ is a direct link or a divalent radicle. All these compounds give linear polyesters having higher melting points than polyesters obtained from purely aliphatic reagents and also higher melting points than polyesters obtained from corresponding reagents containing benzene nuclei linked in different positions, e. g. in the ortho or meta position with a single benzene nucleus or in the 2.2′, 3.3′ or 4.2′ positions with two benzene nuclei. Further important glycols are those containing a single naphthalene nucleus linked to the hydroxy groups through a hetero atom in the 1.4, 1.5, 2.6 and 2.7 positions.

Generally the glycols used are such that each hydroxyl group is linked through one or more hetero atoms to one or more aromatic nuclei and the linkages to the nuclei are such that (taking the shortest path through the carbon atoms of the nucleus) there are at least four nuclear carbon atoms in each nucleus between the linkages. In this definition it will be noted that a single benzene ring or a single naphthalene ring counts as one aromatic nucleus, while diphenyl

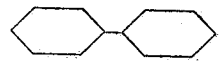

diphenyl alkane

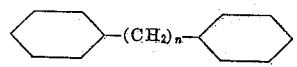

and diphenyl sulphone

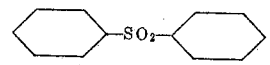

count as two aromatic nuclei. The preferred reagents are those in which the reactive groups are linked to the aromatic nuclei in diametrically opposite positions, that is to say in the para position with a single benzene nucleus, in the 4.4′ position with compounds of the diphenyl series, and in the 1.5 or 2.6 positions with compounds of the naphthalene series.

As examples of aromatic dicarboxylic acids for use according to the present invention, terephthalic acid, 4.4′-dicarboxyl-diphenyl and 4.4′ - dicarboxy-α,β-diphenoxy-ethane may be mentioned. It will be noted that just as with the glycols these dicarboxylic acids have their carboxy groups linked to aromatic nuclei in such positions that there are at least four nuclear carbon atoms in each aromatic nucleus between the linkages.

As examples of the glycols characteristic of the present invention, the following may be instanced: Bis-β-oxyethylhydroquinone, bis-β-oxyethyl-4.4′-dihydroxy-diphenyl and the corresponding derivatives of 2.5-dichlorhydroquinone, 4.4′-dihydroxy-benzophenone, 4.4′-dihydroxy-diphenyl - sulphone, α.β - bis - (4-hydroxyphenoxy)-ethane, 4.4′ - dihydroxy - 3.5.3′.5′ - or 2.5.2′.5′ - tetramethyl diphenyl, and of 1.4-, 1.5-, 2.6- and 2.7-dihydroxy-naphthalenes. The above compounds all appear to be new. They can be made by the action of the appropriate chlorhydrin or other halogen hydrin upon the appropriate diphenol, preferably in the form of an alkali metal salt. Alternatively the reaction may be carried out in alkaline solution. Thus, for example, bis-β-oxyethyl-hydroquinone may be made by the action of ethylene chlorhydrin upon hydroquinone in solution in alcoholic caustic soda or caustic potash. When the reaction is complete, the alkali chloride may be filtered off and the alcohol distilled, and an equal volume of water added to the residue. The somewhat greasy solid filtered and washed with water and recrystallised was obtained as silvery plates having a melting point of about 104° C. Similar preparations may be made with other diphenols having the phenolic groups in the appropriate position and with other halogen hydrins.

The most important polyesters of the present invention are those in which either the glycol or the dicarboxylic acid is of the diphenyl or naphthalene series since such polyesters generally have melting points about 200° C. Especially useful are the polyesters produced from the above described glycols of the diphenyl or naphthalene series condensed with terephthalic acid.

In place of the above reagents containing free hydroxy or carboxy groups, we may employ equivalent ester-forming reagents. Thus, for example, in place of compounds containing free hydroxy groups, the formates or acetates may be used and in place of the free acids the acid chlorides or the simple esters such as the methyl or ethyl esters may be used.

In some cases where the melting point of the polymer is too high, it is desirable to employ a mixture of the glycol characteristic of the invention with a small quantity of an aliphatic glycol, for instance ethylene glycol, propylene glycol, trimethylene glycol, 1.3-butane-diol, 1.4-butane-diol, 2.4-hexane-diol and 1.6-hexane-diol, or to employ a mixture of an aromatic dicarboxylic acid with a small quantity of an aliphatic dicarboxylic acid, e. g. succinic acid, glutaric acid, adipic acid, suberic acid or sebacic acid.

The condensations to produce the polymers of the present invention can be effected generally by heating the components at temperatures of 100–350° C., but of course below decomposition temperatures, and preferably at 200–280° C. or 300° C. If desired, catalysts may be present, for example catalysts facilitating the elimination of water, such as paratoluene sulphonic acid or a trace of phosphoric acid, catalysts such as potassium carbonate or tertiary organic bases which absorb hydrochloric acid or ester interchange catalysts such as alkali metals or magnesium or alkali metal alcoholates. When a volatile by-product is produced such as water or an alcohol, it is of advantage to conduct the reaction, at least in its later stages, in vacuo and preferably under an extremely low absolute pressure. The condensations are preferably carried out in an atmosphere of an oxygen-free inert gas, for example hydrogen or nitrogen, a stream of which may be passed over or through the reaction mixture. When an acid chloride is employed as one of the reagents, it is advisable to use an inorganic alkali or a tertiary organic base, such as pyridine or dimethylaniline, or a terpene to combine with the hydrogen chloride set free.

The poly-condensations are best effected with the reagents and their products of reaction in the molten state or in solution in a suitable solvent medium, for example meta-cresol or phenol which is liquid at the reaction temperature.

To obtain polymers of high molecular weight, the reagents, except in the case of using a reagent which can be volatilized under the reaction conditions, e. g. a volatile glycol, should be used in such proportions that the complementary reactive groups are present in the reaction mixture in substantially equivalent amounts and the reaction is continued until the desired high molecular weight is achieved. In some cases this may take many hours or even some days. By substantially equivalent amounts we mean amounts which are chemically equivalent within five per cent. The nearer the ratio is to chemical equivalence, the higher may be the molecular weight achieved and accordingly we prefer to use amounts that give chemical equivalence within less than two per cent, e. g. ½ to 1%. In poly-esterifications involving volatile glycols, the glycol may be used in excess and allowed to evaporate away from the sphere of reaction as the condensation proceeds.

The polymers of the invention are of value in connection with the production of fibres, films, lacquers and moulding masses, and the invention includes such applications of the polymers, e. g. the production of filaments from solutions of the polymers by wet or dry spinning methods or directly from the molten polymer.

The following examples illustrate the production of polyesters according to the present invention. In all cases the proportions specified are in parts by weight.

*Example 1*

10 parts of 4.4'-di-(β-hydroxyethoxy)-diphenyl (melting 210° C.) and 7.07 parts of dimethyl terephthalate were heated with a small quantity of ester-interchange catalyst (produced by dissolving sodium in anhydrous methanol so as to give a 2.5% solution of sodium) and a small quantity of magnesium ribbon, the temperature being gradually raised to 200° C. The mixture melted and almost immediately solidified. The temperature was then raised to 280° C. in the course of 2 hours and maintained at this temperature for 5½ hours under atmospheric pressure followed by a further 2½ hours at the same temperature under an absolute pressure of 2 mms. of mercury. At this stage the polymer had a melting point of 222–224° C. and gave fibres from the melt with a small amount of cold draw. Heating was continued for a further 5 hours at 280° C., again under an absolute pressure of 2 mms. of mercury. The final polymer had a melting point of 227° C., had an excellent ivory-like appearance and gave fibres from the melt that had good cold-drawing properties.

*Example 2*

12.4 parts of 2.6-di-(β-hydroxyethoxy)-naphthalene (melting point 189° C.) and 9.8 parts of dimethyl terephthalate were heated with a small quantity of ester-interchange catalyst (produced by dissolving sodium in anhydrous methanol so as to give a 2.5% solution of sodium) and a small quantity of magnesium ribbon, the temperature being gradually raised to 180° C. After 30 minutes at this temperature the mixture was heated rapidly to 260° C. and the temperature then taken gradually to 280° C. over approximately 4 hours. The heating was continued for a further 2 hours at this temperature under an absolute pressure of 2–3 mms. of mercury. At this stage the polymer was tough and had a melting point of 245–250° C. It was re-heated at 290° C. under an absolute pressure of 1 mm. of mercury for a further 4 hours, by which time it had a melting point of 252–253° C. and gave good fibres with cold-drawing properties.

*Example 3*

12.4 parts of 1.5-di-(β-hydroxyethoxy)-naphthalene (melting point 179° C.) and 9.7 parts of dimethyl terephthalate were heated with a small quantity of ester-interchange catalyst (produced by dissolving sodium in anhydrous methanol so as to give a 2.5% solution of sodium) and a small quantity of magnesium ribbon, the temperature being taken slowly to 200° C., maintained at this temperature for 1 hour and then raised to 240° C. and held at this temperature for a further 3 hours. By this time the polymer had solidified and the temperature was raised to 280° C. and heating continued at this temperature for 6 hours, followed by a further 3½ hours at 280° C. under an absolute pressure of 1 mm. of mercury. The final polymer had a melting point of 260° C., was very tough and gave fibres with good cold-drawing properties.

*Example 4*

A mixture of 20 parts of p-bis-(β-hydroxyethoxy)-benzene (melting point 104–105° C.), 20 parts of dimethyl terephthalate, 1.6 parts of ethylene glycol and a solution of 0.02 part of metallic sodium in 6.4 parts of absolute ethanol together with a small quantity of magnesium ribbon was heated, while bubbling a slow stream of hydrogen through the melt, first at 160° C. for 1 hour and then at 180° C. for 16 hours. At the end of this period the polymer had solidified. It was re-melted and the temperature held at 250° C. for 3 hours. A vacuum (absolute pressure of 3–4 mms. of mercury) was then applied while maintaining the temperature at 250° C. and the hydrogen stream. After 1 hour vacuum treatment, the polymer showed weak fibre-forming properties and had a melting point of 197–198° C. The vacuum treatment was continued for a further 4 hours at 260° C. The final polymer was tougher but of the same melting point. Analysis gave C 65.64%; H 4.87%.

In all the above examples the glycol was prepared by the action of ethylene chlorhydrin on the appropriate diphenol in aqueous caustic soda solution and in each case the glycol was purified and decolorised by solution in an appropriate solvent with charcoal and recrystallisation. The following recipe shows the production of the p-bis-(β-hydroxyethoxy)-benzene.

A mixture of 30 parts of hydroquinone, 66 parts of ethylene chlorhydrin and 47 parts of caustic potash was refluxed in 160 parts of ethanol for 4 hours. The resulting mixture, which was still alkaline, was filtered hot to remove precipitated potassium chloride and the alcohol evaporated off to a base temperature of 115° C. The residue was then cooled and an equal volume of water added. A light brown, somewhat greasy solid was precipitated and was filtered off and washed with cold water until the washings were colourless. The product was decolorised with animal charcoal and recrystallised from boiling water. It crystallised in silvery plates, melting at 104–105° C., soluble in hot water, alcohol and acetone, insoluble in ether and difficultly soluble in chloroform. Its hydroxy content was very close to the theoretical for p-bis-(β-hydroxyethoxy)-benzene

Having described our invention, what we desire to secure by Letters Patent is:

1. A linear polyester which is the condensation product of an aromatic dicarboxylic acid and a bis-(β-hydroxyethoxy) aromatic compound whose two hydroxyethoxy groups are joined to each other solely through nuclear aromatic carbon atoms, the two components having their respective carboxy and hydroxyethoxy groups linked directly to an aromatic nucleus with at least four nuclear carbon atoms in each aromatic nucleus between the linkages.

2. A linear polyester which is the condensation product of an aromatic dicarboxylic acid and a bis-(β-hydroxyethoxy) aromatic compound, the respective carboxy and hydroxyethoxy groups of the two components being joined to each other solely through nuclear aromatic carbon atoms and being linked directly to an aromatic nucleus with at least four nuclear carbon atoms between the linkages.

3. A linear polyester which is the condensation product of an aromatic dicarboxylic acid and a bis-(β-hydroxyethoxy) aromatic compound, the respective carboxy and hydroxyethoxy groups of the two components being joined to each other solely through nuclear aromatic carbon atoms and being linked directly to the aromatic nucleus in diametrically opposite positions.

4. A linear polyester which is the condensation product of terephthalic acid and a bis-(β-hydroxyethoxy) aromatic compound whose hydroxyethoxy groups are joined to each other solely through nuclear aromatic carbon atoms and being linked directly to the aromatic nucleus in diametrically opposite positions.

5. A linear polyester which is the condensation product of terephthalic acid and a bis-(β-hydroxyethoxy) derivative of an aromatic hydrocarbon selected from the diphenyl and naphthalene series, whose sole carbon atoms are nuclear aromatic carbon atoms, in which the hydroxyethoxy groups are linked directly to the nuclei in diametrically opposite positions.

6. A polyester being the condensation product of 4.4'-di-(β-hydroxyethoxy)-diphenyl and terephthalic acid.

7. A polyester being the condensation product of 2.6-di-(β-hydroxyethoxy)-naphthalene and terephthalic acid.

8. A polyester being the condensation product of 1.5-di-(β-hydroxyethoxy)-naphthalene and terephthalic acid.

9. Process for the production of polyesters, which comprises condensing a reagent selected from the group consisting of an aromatic dicarboxylic acid and ester-forming derivatives thereof with a reagent selected from the group consisting of bis-(β-hydroxyethoxy) aromatic compounds whose two hydroxyethoxy groups are joined to each other solely through nuclear aromatic carbon atoms and ester-forming derivatives thereof, the two components having their respective carboxy and hydroxyethoxy groups linked directly to an aromatic nucleus with at least four nuclear carbon atoms in each aromatic nucleus between the linkages.

10. Process for the production of polyesters, which comprises condensing a reagent selected from the group consisting of aromatic dicarboxylic acids and ester-forming derivatives thereof with a reagent selected from the group consisting of bis-(β-hydroxyethoxy) aromatic compounds and ester-forming derivatives thereof, the respective carboxy and hydroxyethoxy groups of the two components being joined to each other solely through nuclear aromatic carbon atoms and being linked directly to an aromatic nucleus with at least four nuclear carbon atoms between the linkages.

11. Process for the production of polyesters which comprises condensing a reagent selected from the group consisting of aromatic dicarboxylic acids and ester-forming derivatives thereof with a reagent selected from the group consisting of bis-(β-hydroxyethoxy) aromatic compounds and ester-forming derivatives thereof, the respective carboxy and hydroxyethoxy groups of the two components being joined to each other solely through nuclear aromatic carbon atoms and being linked directly to the aromatic nucleus in diametrically opposite positions.

12. Process for the production of polyesters, which comprises condensing a reagent selected from the group consisting of terephthalic acid and its ester-forming derivatives with a reagent selected from the group consisting of bis-(β-hydroxyethoxy) aromatic compounds and their ester-forming derivatives, the hydroxyethoxy groups being joined to each other solely through nuclear aromatic carbon atoms and being linked directly to the aromatic nucleus in diametrically opposite positions.

13. Process for the production of polyesters, which comprises condensing a reagent selected from the group consisting of terephthalic acid and its ester-forming derivatives with a reagent selected from the group consisting of bis-(β-hydroxyethoxy) derivatives of aromatic hydrocarbons selected from the diphenyl and naphthalene series, whose carbon atoms are all nuclear carbon atoms and ester-forming derivatives thereof, in which the two β-hydroxyethoxy groups are linked directly to the aromatic nucleus in diametrically opposite positions.

References Cited in the file of this patent
UNITED STATES PATENTS

| 2,437,046 | Rothrock et al. | Mar. 2, 1948 |
| 2,593,411 | Caldwell | Apr. 22, 1952 |

OTHER REFERENCES

Hill et al.: Jour. Polymer Science, vol. 3, October 1948, pages 609–630.